(12) United States Patent
Tissot et al.

(10) Patent No.: US 10,404,668 B2
(45) Date of Patent: Sep. 3, 2019

(54) TECHNIQUE FOR SECURELY PERFORMING AN OPERATION IN AN IOT ENVIRONMENT

(71) Applicant: Kontron Modular Computers S.A.S., Toulon (FR)

(72) Inventors: Serge Tissot, Hyeres (FR); Amina Belkorchi, Le Pradet (FR); Thomas Richard, Veauche (FR)

(73) Assignee: Kontron Modular Computers S.A.S, Toulon (FR)

( * ) Notice: Subject to any disclaimer, the term of this patent is extended or adjusted under 35 U.S.C. 154(b) by 99 days.

(21) Appl. No.: 15/649,615

(22) Filed: Jul. 13, 2017

(65) Prior Publication Data
US 2018/0019983 A1 Jan. 18, 2018

(30) Foreign Application Priority Data

Jul. 14, 2016 (EP) ..................................... 16179444

(51) Int. Cl.
*H04L 9/00* (2006.01)
*H04W 4/70* (2018.01)
(Continued)

(52) U.S. Cl.
CPC ........ *H04L 63/0442* (2013.01); *G06F 21/602* (2013.01); *G06F 21/62* (2013.01);
(Continued)

(58) Field of Classification Search
CPC . H04L 63/0442; H04L 63/0428; H04L 63/04; H04L 63/061; H04L 63/0876;
(Continued)

(56) References Cited

U.S. PATENT DOCUMENTS

| 8,515,058 B1 * | 8/2013 | Gentry | H04L 9/008 380/28 |
| 8,630,422 B2 * | 1/2014 | Gentry | H04L 9/0822 380/281 |

(Continued)

FOREIGN PATENT DOCUMENTS

KR    10-2015-0035971    4/2015

OTHER PUBLICATIONS

Chen et al., Fully Homomorphic Encryption Application in Cloud Computing, IEEE (Year: 2014).*

(Continued)

*Primary Examiner* — Kambiz Zand
*Assistant Examiner* — Mahabub S Ahmed
(74) *Attorney, Agent, or Firm* — Straub & Straub; Michael P. Straub; Stephen T. Straub

(57) ABSTRACT

The present disclosure relates to a computing unit for securely performing an operation on encrypted data in an Internet of Things, IoT, environment. The computing unit comprises a secure element, at least one processor and at least one memory, wherein the at least one memory contains instructions executable by the at least one processor such that the computing unit is operable to obtain (S302) encrypted data collected by a sensor provided in the IoT environment, pass (S304) the encrypted data to the secure element requesting the secure element to decrypt the encrypted data and to perform an operation on the decrypted data, and obtain (S306) an encrypted or non-encrypted result of the operation from the secure element.

11 Claims, 4 Drawing Sheets

(51) Int. Cl.
*G06F 21/60* (2013.01)
*G06F 21/62* (2013.01)
*G06F 21/83* (2013.01)
*H04L 29/06* (2006.01)
*H04W 12/02* (2009.01)

(52) U.S. Cl.
CPC .............. *G06F 21/83* (2013.01); *H04L 9/008* (2013.01); *H04L 63/0428* (2013.01); *H04W 4/70* (2018.02); *H04W 12/02* (2013.01); *H04L 63/04* (2013.01); *H04L 63/061* (2013.01); *H04L 63/0876* (2013.01)

(58) Field of Classification Search
CPC ........ H04L 9/008; H04W 4/70; H04W 12/02; G06F 21/602; G06F 21/62; G06F 21/83
USPC .......................................................... 713/171
See application file for complete search history.

(56) References Cited

U.S. PATENT DOCUMENTS

| | | | | |
|---|---|---|---|---|
| 9,619,658 | B2* | 4/2017 | Maniatakos | G06F 21/602 |
| 10,075,288 | B1* | 9/2018 | Khedr | H04L 9/008 |
| 2003/0223579 | A1* | 12/2003 | Kanter | H04L 9/304 |
| | | | | 380/28 |
| 2005/0201555 | A1* | 9/2005 | Yen | H04L 9/3218 |
| | | | | 380/30 |
| 2006/0041533 | A1* | 2/2006 | Koyfman | G06F 21/6227 |
| 2006/0143446 | A1* | 6/2006 | Frank | G06F 21/57 |
| | | | | 713/164 |
| 2007/0002140 | A1* | 1/2007 | Benson | G05B 13/0275 |
| | | | | 348/143 |
| 2010/0091984 | A1* | 4/2010 | Kerschbaum | G06F 21/72 |
| | | | | 380/30 |
| 2011/0211692 | A1* | 9/2011 | Raykova | H04L 9/008 |
| | | | | 380/46 |
| 2011/0264920 | A1* | 10/2011 | Rieffel | H04L 9/008 |
| | | | | 713/189 |
| 2013/0010950 | A1* | 1/2013 | Kerschbaum | H04L 9/008 |
| | | | | 380/30 |
| 2013/0329883 | A1* | 12/2013 | Tamayo-Rios | H04L 9/008 |
| | | | | 380/28 |
| 2014/0195818 | A1* | 7/2014 | Neumann | G06F 21/6209 |
| | | | | 713/189 |
| 2015/0193628 | A1* | 7/2015 | Maniatakos | G06F 21/602 |
| | | | | 713/164 |
| 2015/0207630 | A1* | 7/2015 | Shimoyama | G06F 21/32 |
| | | | | 713/186 |
| 2015/0215123 | A1* | 7/2015 | Kipnis | H04L 9/008 |
| | | | | 380/46 |
| 2015/0365229 | A1* | 12/2015 | Patey | H04L 9/008 |
| | | | | 380/30 |
| 2016/0004874 | A1* | 1/2016 | Ioannidis | H04L 9/008 |
| | | | | 713/165 |
| 2016/0105402 | A1* | 4/2016 | Soon-Shiong | H04L 63/0428 |
| | | | | 713/164 |
| 2016/0232116 | A1* | 8/2016 | Bone | H04W 4/70 |
| 2016/0366180 | A1* | 12/2016 | Smith | H04L 9/088 |
| 2017/0019248 | A1* | 1/2017 | Mustafa | H04L 9/008 |
| 2017/0063525 | A1* | 3/2017 | Bacon | H04L 9/008 |
| 2017/0070351 | A1* | 3/2017 | Yan | G06F 21/44 |
| 2017/0149557 | A1* | 5/2017 | Bacon | H04L 9/008 |
| 2017/0262525 | A1* | 9/2017 | Eigner | H04L 67/30 |
| 2017/0293913 | A1* | 10/2017 | Gulak | G06Q 20/3829 |
| 2017/0310549 | A1* | 10/2017 | Nagesh | H04L 43/08 |
| 2018/0069696 | A1* | 3/2018 | Yoo | G06F 21/6245 |
| 2018/0198632 | A1* | 7/2018 | Gajek | H04L 9/00 |
| 2018/0300497 | A1* | 10/2018 | Carpov | G06F 21/6227 |
| 2018/0359229 | A1* | 12/2018 | Ding | H04L 9/008 |

OTHER PUBLICATIONS

Boneh et al., Evaluating 2-DNF Formulas on Ciphertexts, Springer (Year: 2005).*
Kocabas et al., Utilizing Homomorphic Encryption to Implement Secure and Private Medical Cloud Computing, IEEE (Year: 2015).*
Brenner et al., Secret Program Execution in the Cloud Applying Homomorphic Encryption, IEEE (Year: 2011).*
Simone Cirani, Gianluigi Ferrari and Luca Veltri, Enforcing Security Mechanisms in the IP-Based Internet of Things: An Algorithmic Overview, Algorithms 2013, Apr. 2, 2013, pp. 1-30, www.mdpi.com/journal/algorithms.
European Patent Office, European Search Report from EP Application 16179444.1, dated Nov. 28, 2016, pp. 1-4.

* cited by examiner

TECHNIQUE FOR SECURELY PERFORMING AN OPERATION IN AN IOT ENVIRONMENT

TECHNICAL FIELD

The present disclosure generally relates to Internet of Things (IoT) environments. More particularly, the present disclosure relates to a computing unit for securely performing an operation on encrypted data in an IoT environment, a method for securely performing an operation on encrypted data in an IoT environment as well as to a computer program for executing the method.

BACKGROUND

Over the recent years, IoT systems have evolved as systems of interrelated physical objects equipped with computing, sensing and networking capabilities enabling the objects to collect and exchange data without requiring human-to-human or human-to-computer interaction. An IoT system allows physical objects to be sensed and controlled autonomously, enabling for a more direct integration of the physical world into computer-based systems. "Things" in the sense of IoT may refer to a wide variety of objects, such as, e.g., persons with heart monitor implants, animals with biochip transponders, automobiles with built-in sensors, or any other natural or man-made objects that can be assigned a unique identifier, typically an IP address, and that can be provided with the ability to transfer data over a network.

An IoT system typically comprises sensors and actuators that provide and receive data from a cloud through gateways or data aggregators. Analytics engines may be used to analyze the gathered data to make decisions affecting and controlling objects in the IoT environment. Analytics engines may, on the one hand, perform so called "cloud analytics" where data analytics processes are provided through a public or private cloud computing environment. Analytics engines may, on the other hand, also run in the field, e.g., on edge nodes of a network, such as on the sensors themselves, network switches or other devices outside the cloud, and perform so called "edge analytics" without a need to send the data to the cloud for analysis purposes.

In an example, industrial manufacturing machines may be connected to an IoT system and streaming data from these machines may create massive amounts of operational data. By performing analysis of the data through analytics engines, control information may be derived and applied to the machines to preserve or enhance their operational state. Also, a likely failure of a specific part of a particular machine may be identified and the machine may automatically be shut down. An alert may be sent to a plant manager so that the part can be replaced or the failure otherwise be fixed.

Typically, analytics computations are performed on plaintext of the gathered data, thereby opening security holes enabling hackers that gain access to the relevant computing systems to manipulate the control of the objects, to get knowledge of the reported data (confidentiality) and/or to silently compromise a precious database by injecting corrupted data (integrity) in the IoT environment.

SUMMARY

Accordingly, there is a need for a technique that allows performing edge or cloud analytics in an IoT environment without exposing plaintext of the gathered data, no matter whether the data is traveling on the network, stored temporarily or permanently in a computer main memory/storage subsystem or passing through processor registers/caches/arithmetic logical units.

According to a first aspect, a computing unit for securely performing an operation on encrypted data in an Internet of Things (IoT) environment is provided. The computing unit comprises a secure element, at least one processor and at least one memory. The at least one memory contains instructions executable by the at least one processor such that the computing unit is operable to obtain encrypted data collected by a sensor provided in the IoT environment, pass the encrypted data to the secure element requesting the secure element to decrypt the encrypted data and to perform an operation on the decrypted data, and obtain a result of the operation from the secure element.

The secure element may thus be employed to securely perform desired operations on the encrypted data. In particular, the computing unit may not decrypt the encrypted data and perform the operation on the decrypted data itself, but may rather rely on the secure element to perform these tasks. In this way, it is made sure that the decrypted data, i.e., the plaintext of the encrypted data, is never exposed outside the secure environment provided by the secure element. The decrypted data is may thus not be visible to the computing unit itself and, therefore, even in case of a security breach on the computing unit, it may not be possible for an intruder to gain access to the actual plaintext of the encrypted data or to inject corrupted data.

Secure elements are well known in the art. A secure element may be a tamper-proof device that provides a secure storage and execution environment. A secure element generally ensures integrity and confidentiality of its content. Secure elements may be provided as independent microcontrollers (e.g., chips)—often offered with a security certification like FIPS-140-2 or Common Criteria—and may come in different forms, such as in the form of smart cards, where the chip is embedded in a physical card, in the form of UICC (Universal Integrated Circuit Card) or SIM cards, and in the form of smart SD cards, where the chip is integrated on an SD card. Secure elements may also come as embedded secure elements, where the chip may be bonded directly to a device motherboard, for example. A secure element may host one or more applications—commonly called on-card applications—that may interact with off-card applications provided on the host of the secure element through an application programming interface (API). On the contrary to the at least one processor of the computing unit, the secure element may be simple enough and dedicated to specialized tasks so that it is feasible to get certification by demonstrating it cannot be attacked internally or by known side channel methods.

The secure element of the computing unit may thus provide an API which may be used by the computing unit to interact with the secure element as described herein, e.g., for passing the encrypted data (single data or plurality of data) to the secure element, requesting the secure element to decrypt the data and to perform internally the requested operation on the decrypted data as well as obtaining the result of the operation from the secure element. When the computing unit passes the encrypted data to the secure element, the secure element may decrypt the encrypted data to generate plaintext of the encrypted data accordingly. The secure element may then perform the requested operation on the plaintext of the encrypted data and, once the operation is complete, the secure element may return a result of the operation to the computing unit.

The sensor which collects the encrypted data in the IoT environment may be a smart sensor, for example, i.e., a sensor which comprises built-in computing resources that allow performing predefined functions, e.g., signal processing functions or encryption functions, before passing the sensed data to a receiver. The data collected by the smart sensor may be encrypted by the sensor itself and transmitted to the computing unit accordingly. If the sensor is not a smart sensor, the sensor may sense environmental data only, wherein the sensed data is processed and encrypted by a processing unit which the sensor is connected to. The encrypted data may then be transmitted from the processing unit to the computing unit. In one specific variant, the processing unit may be the computing unit itself so that the computing unit itself is a smart sensor.

The operation requested by the computing unit may be part of an analytics computation performed in the IoT environment. In analytics computations, mathematical operations may typically be performed on the data collected by the sensor. Thus, in one implementation, the requested operation may be a mathematical operation, such as a simple arithmetic operation (e.g., addition, multiplication, etc.). Before returning the result of the operation to the computing unit, the secure element may encrypt the result of the operation so that the computing unit obtains the result of the operation in encrypted form.

In another type of request to the secure element, the requested operation may be a comparison operation between two or more portions of the encrypted data. The comparison operation may comprise operations such as "equal to", "less than", "greater than", or the like. The compared portions of the encrypted data may comprise, for example, a first portion which has been obtained from a first sensor and a second portion which has been obtained from a second sensor, or the first and the second portion may have been received subsequently from the same sensor. The result of the comparison operation may be returned from the secure element without applying further encryption so that the computing unit obtains the result of the comparison operation in unencrypted form, particularly as an unencrypted Boolean value. Although returning non-encrypted data could be considered as a possible leak of information in the case of an attack, it may sometimes be useful for the at least one processor of the computing unit to perform conditional branch based on an uncrypted Boolean result of a comparison. In this case, it may be useful that the API of the secure element offers to work with encrypted mathematical operators so that returning a plaintext Boolean does not give much information on the operands of the operators.

It is thus apparent that the computing unit described herein may be enabled to perform operations on the encrypted data without ever having access to plaintext of the encrypted data. In case of mathematical operations, operations can be performed on the sensed data although the data is not visible to the computing unit itself. The computing unit may e.g. be a smart sensor, a network switch, a gateway or another edge node of a network outside a cloud. Alternatively, the computing unit may be a physical or virtual computing unit provided in a cloud. Using one or more computing units of such type eventually allows providing end to end encryption in the IoT environment and allows encrypting data at or close to a sensor as well as performing edge or cloud analytics without exposing plaintext of the data at any time. Once the data is encrypted close to the object, any error related to human factors (wrong setup of classical security parameters, corruption of individuals, etc.) may be avoided. Protection thus provided may be called end to no end rather than end to end protection.

In case of comparison operations, the computing unit may be enabled to raise alerts and/or to control program flows since the result of a comparison operation may be visible to the computing unit (only the result may be visible, not the compared data itself). The at least one memory of the computing unit may thus further contain instructions executable by the at least one processor such that the computing unit is operable to raise an alert based on the result of the operation. In one particular API request provided by the secure element, the operation may be an encrypted comparison operation. In a pure example, 6537298 may be the encryption of the "equal to" operator and 22223333 may be the encryption of the "less than" operator, and so on. Due to a random factor in the employed encryption scheme, the same comparison operator may not always be encrypted with the same value. In this case, it may neither be revealed what type of comparison is performed nor on what data the comparison is performed.

In general, the encrypted data obtained by the computing unit may be encrypted using a homomorphic encryption scheme or using a non-homomorphic encryption scheme. Non-homomorphic encryption schemes may include well known symmetric algorithms with single encryption/decryption keys, such as AES, or asymmetric algorithms with private and public key encryption schemes, such as RSA, for example. Plausible fully homomorphic encryption schemes, on the other hand, are known from Craig Gentry's PhD thesis "A Fully Homomorphic Encryption Scheme" of September 2009, for example. Homomorphic encryption is a form of encryption that allows computations to be carried out directly on ciphertext. A homomorphic computation of an operation (e.g., addition, multiplication, etc.) carried out on encrypted data generates an encrypted result that, when decrypted, matches the result of the same operation performed on the plaintext of the encrypted data. When both additions and multiplications could be performed on ciphertext, the encryption scheme is qualified as Fully Homomorphic Encryption (FHE). All mathematical operations can then be derived from the addition and multiplication operators.

The application of homomorphic cryptography generally requires significant processing resources (in particular, processing speed, large amounts of memory and, as a consequence, network speed) that may only exist in cloud environments even for modest plaintext operation complexity. Thus, if the encrypted data is encrypted using a homomorphic encryption scheme, typical resource consuming homomorphic computations can be avoided or accelerated by applying the above-described technique of performing operations on the encrypted data via the secure element attached to the computing unit (which can be local to the computing unit, or remote on premise). This may particularly be true for homomorphic refresh operations. Homomorphic refresh operations may form part of Gentry's cryptosystem in which it is possible to compute arbitrary numbers of additions and multiplications without increasing noise too much by "refreshing" the ciphertext periodically whenever the noise gets too large to allow correct future decryption. In these cases, each homomorphic refresh computation may be replaced by a simple decryption and fresh re-encryption of the data within the secure element. Further, in case of comparison operations, it is apparent that—although the result of a comparison can be computed using homomorphic cryptography—the comparison result (e.g., a Boolean result) is still encrypted so that the result may not be used for raising alerts and/or for implementing conditional program flows. Such measures can rather be achieved by the above-described technique of performing operations via the secure element of the computing unit.

For purposes of the decrypting and re-encrypting the data in both homomorphic and non-homomorphic encryption schemes, the secure element may store a corresponding decryption/encryption key. The decryption/encryption key may be provided to the secure element by the computing unit during a commissioning phase or during the boot process, for example, using a standard key distribution algorithm, such as asymmetric cryptography or the Diffie-Hellman algorithm.

In other implementations, particularly when the encrypted data is encrypted using a non-homomorphic encryption scheme, measures may be taken to prevent guessing plaintext values of the encrypted data. For this purpose, a plaintext value of the encrypted data may be complemented with one or more random padding values before generating the encrypted data, i.e., before actually encrypting the data. In this way, it may be prevented that encryption of numbers, such as 0, 1, 2, . . . may be guessed by a hacker by submitting to the secure element calculations like "x−x" or "y/y". For the same purpose, the secure element may be configured to reject, or to silently ignore the operation and mark the result as invalid, a requested operation if the operation is predefined as an operation that allows guessing a plaintext value of the encrypted data (again, including operations such as "x−x" or "y/y").

In addition, to protect the integrity of a data element, or a set of data elements, a checksum or hash value can be added before initial encryption or result re-encryption, so that it is not possible to introduce in a database any data element without owning the initial encryption/decryption key at or close to the sensor. A plaintext value of the encrypted data may thus be supplemented with a checksum or hash value.

In a further refinement, even if a new data element cannot be generated by a hacker, integrity might still be affected in a case where some existing encrypted data would be duplicated or swapped by corrupting a program. To avoid this possibility, a traceability field may be appended to each data element (before encryption/re-encryption), initially storing a data sequence number and/or a unique device number. Each time an operation is performed on one or more data elements, leading to a resulting data, an operation (the same or alternatively just a simple addition which might include a coded operator involved) may be performed on the traceability field, so that the resulting data is tagged with the result of the operation performed on the traceability field, the tag being stored on the same traceability field. In this way, a traceability of the correct operations performed on the expected ordered data may be obtained along with each data result, making it possible at the end of the calculations to verify that the final result was obtained by processing the correct ordered set of data. The final verification of the traceability field may be made inside the secure element, before entering the resulting data into the encrypted database.

In still further implementations, the secure element may be configured to apply a timer that triggers a reset of the secure element, if a correct cryptographic key is not provided by the computing unit to the secure element before expiration of the timer. The timer may be employed as a watchdog timer that (e.g., after a predefined time period after the initialization or boot process of the computing unit and/or on regular time periods thereafter) triggers a reset of the secure element (and optionally of the computing unit as well) to avoid analysis of the encrypted data, opportunity to export the data, opportunity to alter a program, and to prevent platform retargeting of the computing unit to another purpose.

From the foregoing, it may be gathered that employing a secure element for securely performing an operation on encrypted data is advantageous in various respects. It will be understood, however, that, in the absence of a secure element in the computing unit, securely performing an operation on encrypted data is still possible through the use of homomorphic cryptography, though with a potentially much higher workload.

Thus, according to a second aspect, another computing unit for securely performing an operation on encrypted data in an Internet of Things (IoT) environment is provided. The computing unit comprises at least one processor and at least one memory. The at least one memory contains instructions executable by the at least one processor such that the computing unit is operable to obtain encrypted data collected by a sensor provided in the IoT environment, wherein the encrypted data is encrypted using a homomorphic encryption scheme, and perform a homomorphic computation of an operation on the encrypted data to generate an encrypted result that, when decrypted, matches a result of the operation performed on plaintext of the encrypted data.

Those features described above in relation to the computing unit of the first aspect which are applicable to the computing unit of the second aspect may be comprised by the computing unit of the second aspect as well. This particularly applies to the sensor which collects the encrypted data and to the characteristics of using homomorphic encryption schemes. Unnecessary repetitions are thus omitted. The operation performed through the homomorphic computation may be a mathematical operation, such as a simple arithmetic operation (e.g., addition, multiplication, etc.).

According to a third aspect, a method for securely performing an operation on encrypted data in an Internet of Things (IoT) environment is provided. The method is performed by a computing unit which comprises a secure element. The method comprises obtaining encrypted data collected by a sensor provided in the IoT environment, passing the encrypted data to the secure element requesting the secure element to decrypt the encrypted data and to perform an operation on the decrypted data, and obtaining a result of the operation from the secure element.

The method may be performed by the computing unit according to the first aspect. All apparatus features described herein with reference to the first aspect may thus also be embodied as functions, services or steps in the method of the third aspect.

According to a fourth aspect, a method for securely performing an operation on encrypted data in an Internet of Things (IoT) environment is provided. The method is performed by a computing unit and comprises obtaining encrypted data collected by a sensor provided in the IoT environment, wherein the encrypted data is encrypted using a homomorphic encryption scheme, and performing a homomorphic computation of an operation on the encrypted data to generate an encrypted result that, when decrypted, matches a result of the operation performed on plaintext of the encrypted data.

The method may be performed by the computing unit according to the second aspect. All apparatus features described herein with reference to the second aspect may thus also be embodied as functions, services or steps in the method of the fourth aspect.

According to a fifth aspect, a computer program product is provided. The computer program product comprises program code portions for performing the method of either the third aspect or the fourth aspect when the computer program product is executed on a computing device. The computing device may be the computing unit according to the first aspect or the second aspect accordingly. The computer program product may be stored on a computer readable recording medium, such as a semiconductor memory, DVD, CD-ROM, or the like.

All of the aspects described herein may be implemented by hardware circuitry and/or by software. Even if some of the aspects are described herein with respect to a computing unit, these aspects may also be implemented as a method or as a computer program for performing or executing the method. Likewise, aspects described as or with reference to a method may be realized by suitable components in a computing unit, or by means of the computer program.

BRIEF DESCRIPTION OF THE DRAWINGS

In the following, the present disclosure will further be described with reference to exemplary implementations illustrated in the figures, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other implementations that depart from these specific details.

Figure 1:
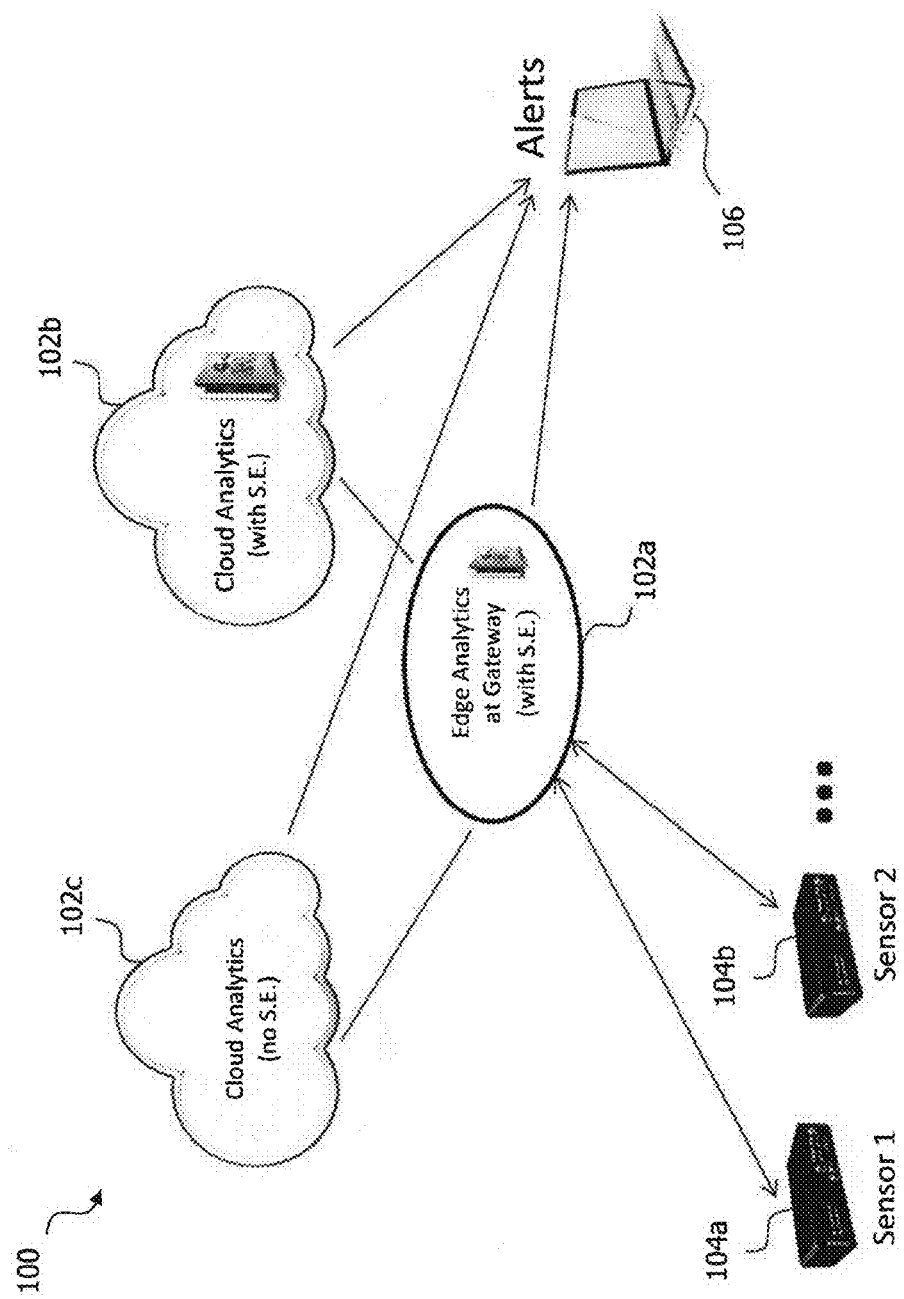
FIG. 1 schematically illustrates an IoT environment in which the technique of to the present disclosure may be practiced.

FIG. 1 schematically illustrates an Internet of Things (IoT) environment 100 in which analytics engines 102a, 102b and 102c are provided to perform analysis of data received from sensors 104a and 104b. Among the analytics engines 102a, 102b and 102c, analytics engine 102a is hosted on a network gateway and is configured to perform edge analytics on data received from the sensors 104a and 104b. In the illustrated example, the network gateway is equipped with a secure element. Analytics engine 102b, on the other hand, is hosted on a computing unit in a cloud computing environment and is configured to perform cloud analytics on the data received via the network gateway from the sensors 104a and 104b. The computing unit which hosts analytics engine 102b is equipped with a secure element. Similarly, analytics engine 102c is hosted on a computing unit in a cloud computing environment and is configured to perform cloud analytics on the data received via the network gateway from the sensors 104a and 104b as well. In contrast to analytics engine 102b, however, analytics engine 102c is not equipped with a secure element.

In the illustrated example, the sensors 104a and 104b are provided in the form of smart sensors which have built-in computing resources that allow performing signal processing functions and encryption functions, for example. The data collected by the sensors 104a and 104b is encrypted by the sensors 104a and 104b themselves and then transmitted—in encrypted form—to analytics engine 102a where the encrypted data is subjected to an analytics procedure. The encrypted data, or a portion thereof, may further be distributed from analytics engine 102a to analytics engines 102b and 102c where other parts of an overall analytics computation on the encrypted data may be performed. As a result of the analytics computation, control information may be derived and applied to controllable objects (not shown) in the IoT environment 100 to control their operational state. If, as a result of the analytics computation, alerts need to be raised, these alerts may be sent from the analytics engines 102a, 102b and 102c to a workstation 106 which may be a plant manager's workstation, for example.

Figure 2:
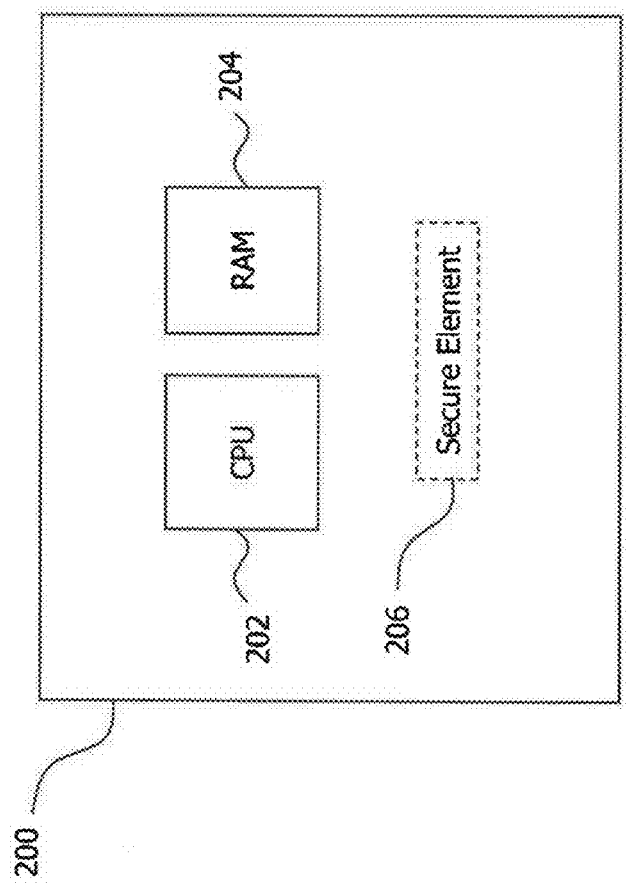
FIG. 2 schematically illustrates a composition of a computing unit for securely performing an operation on encrypted data according to the present disclosure.

FIG. 2 schematically illustrates an exemplary composition of a computing unit 200 which can be used for securely performing an operation on encrypted data in the IoT environment 100. The computing unit 200 may correspond to a computing unit which hosts one of the analytics engines 102a, 102b and 102c. The computing unit 200 comprises a processor 202 and a memory 204, wherein the memory 204 contains instructions that are executable by the processor 202 such that the computing unit 200 is operable to perform the functions described herein.

It will be understood that, in a cloud architecture, such as in the case of analytics engines 102b and 102c, the computing unit 200 may be a physical computing unit, but may be a virtualized computing unit as well, such as a virtual machine (VM). It will further be understood that the computing unit 200 does not necessarily have to be a standalone computing unit, but may be implemented as a component—realized in software and/or hardware—on a single or on multiple computing units (being either physical or virtual) in the cloud environment.

The computing unit 200 may further comprise a secure element 206, which is an optional component of the computing unit 200. The secure element 206 may be employed to securely performing desired operations on the encrypted data. The computing unit 200 may not decrypt the encrypted data itself, but may rather rely on the secure element 206 to perform this task. In this way, it is made sure that the decrypted data, i.e., the plaintext of the encrypted data, is never exposed outside the secure environment provided by the secure element 206. In particular, the decrypted data is may not be visible to the computing unit 200 itself and, thus, even in case of a security breach on the computing unit 200, it may not be possible for an intruder to gain access to the actual plaintext of the encrypted data.

The secure element 206 is a tamper-proof device that provides a secure storage and execution environment. The secure element 206 may be provided as an independent microcontroller (e.g., chip) and may come in different forms, such as in the form of a smart card, where the chip is embedded in a physical card, in the form of a UICC (Universal Integrated Circuit Card) or SIM card, and in the form of a smart SD card, where the chip is integrated on an SD card. The secure element 206 may also come in the form of an embedded secure element, where the chip may be bonded directly to a motherboard of the computing unit 200, for example. The secure element 206 may provide an API which may be used by the computing unit 200 to interact with the secure element 206 as described herein below with reference to FIG. 3.

Figure 3:
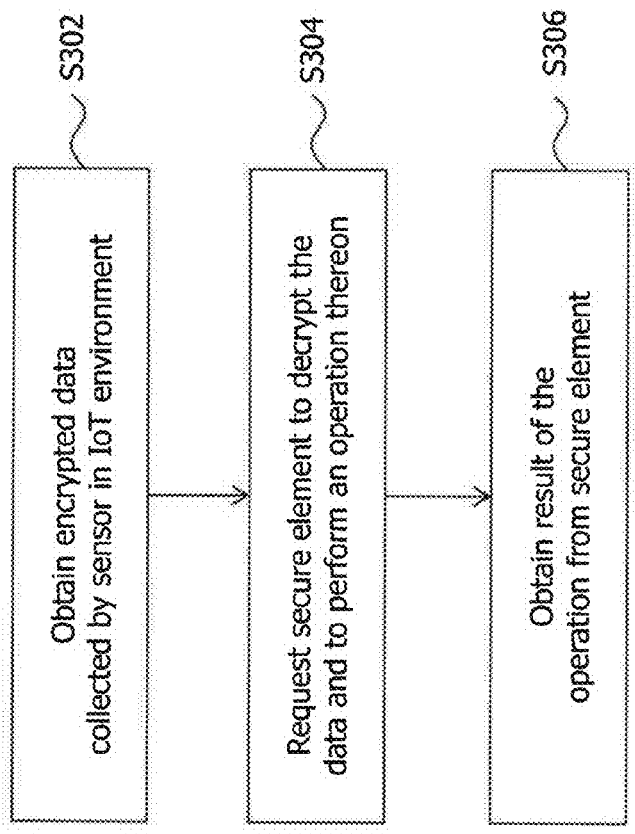
FIG. 3 schematically illustrates a flowchart of a method which may be performed by the computing unit of FIG. 2.

FIG. 3 schematically illustrates a flowchart of a method for securely performing an operation on encrypted data in the IoT environment 100. The method may be performed by the computing unit 200 which—with reference to the example of FIG. 1—may be the computing unit 200 which hosts analytics engine 102a or analytics engine 102b. The method begins at step S302, at which the computing unit 200 obtains encrypted data collected by at least one of the sensors 104a and 104b. At step S304, the computing unit 200 passes the encrypted data to the secure element 206 requesting the secure element 206 to decrypt the encrypted data and to perform an operation on the decrypted data. The secure element 206 decrypts the encrypted data to generate plaintext of the encrypted data and then performs the requested operation on the plaintext of the encrypted data. Once the operation is complete, the secure element 206 returns a result of the operation to the computing unit 200. Finally, at step S306, the computing unit 200 obtains the result of the operation from the secure element 206.

The operation requested by the computing unit 200 may be part of an analytics computation performed in the IoT environment 100. The requested operation may be a mathematical operation, such as a simple arithmetic operation (e.g., addition, multiplication, etc.). Before returning the result of the operation to the computing unit 200, the secure element 206 may encrypt the result of the operation so that the computing unit 200 obtains the result of the operation in encrypted form.

The requested operation may also be a comparison operation between two or more portions of the encrypted data. The comparison operation may comprise operations such as "equal to", "less than", "greater than", or the like. The compared portions of the encrypted data may comprise, for example, a first portion which has been obtained from the sensor 104a and a second portion which has been obtained from the sensor 104b, or the first and the second portion may have been received subsequently from one of the sensors 104a or 104b. The result of the comparison operation may be returned from the secure element 206 without applying further encryption so that the computing unit 200 obtains the result of the comparison operation in unencrypted form.

It is thus apparent that the computing unit 200 may be enabled to perform operations on the encrypted data without ever having access to plaintext of the encrypted data. In case of mathematical operations, operations can be performed on the sensed data although the data is not visible to the computing unit 200 itself. Using one or more computing units in accordance with computing unit 200, such as for hosting the analytics engines 102a and 102b, for example, eventually allows providing end to end encryption in the IoT environment 100 and allows encrypting data at the sensors 104a and 104b as well as performing edge or cloud analytics without exposing plaintext of the data at any time.

In case of comparison operations, the computing unit 200 may be enabled to raise alerts and/or to control program flows when the result of a comparison operation is visible to the computing unit 200 (only the result may be visible, not the compared data itself). The computing unit 200 may thus send an alert to the workstation 106. The operation may be an encrypted comparison operation so that it is neither revealed what type of comparison is performed nor on what data the comparison is performed.

In general, the encrypted data obtained by the computing unit 200 may be encrypted using a homomorphic encryption scheme or using a non-homomorphic encryption scheme. Non-homomorphic encryption schemes may include well known private or public key encryption schemes, such as RSA or symmetric algorithms with a unique encryption/decryption key, such as AES, for example. Plausible homomorphic encryption schemes, on the other hand, are known from in Craig Gentry's PhD thesis "A Fully Homomorphic Encryption Scheme" of September 2009, for example. Homomorphic encryption is a form of encryption that allows computations to be carried out directly on ciphertext. A homomorphic computation of an operation (e.g., addition, multiplication, etc.) carried out on encrypted data generates an encrypted result that, when decrypted, matches the result of the same operation performed on the plaintext of the encrypted data.

The application of homomorphic cryptography generally requires significant processing resources (in particular, large amounts of memory) that may only exist in cloud environments even for modest plaintext operation complexity. Thus, if the encrypted data is encrypted using a homomorphic encryption scheme, typical resource consuming homomorphic computations can be avoided or accelerated by applying the above-described technique of performing operations on the encrypted data via the secure element 206 of the computing unit 200. This may particularly be true for homomorphic refresh operations. Homomorphic refresh operations may form part of Gentry's cryptosystem in which it is possible to compute arbitrary numbers of additions and multiplications without increasing noise too much by "refreshing" the ciphertext periodically whenever the noise gets too large. In these cases, each homomorphic refresh computation may be replaced by a simple decryption, application of corresponding operations and re-encryption within the secure element 206. Further, in case of comparison operations, it is apparent that—although the result of a comparison can be computed using homomorphic cryptography—the comparison result (e.g., a Boolean result) is still encrypted so that the result may not be used for raising alerts and/or for implementing conditional program flows. Such measures can rather be achieved by application of the above-described technique of performing operations via the secure element 206 of the computing unit 200.

For purposes of the decrypting the encrypted data in both homomorphic and non-homomorphic encryption schemes, the secure element 206 may store a corresponding decryption key. The decryption key may be provided to the secure element 206 by the computing unit 200 in an initialization or boot process, for example.

When the encrypted data is encrypted using a non-homomorphic encryption scheme, measures may be taken to prevent guessing plaintext values of the encrypted data. For this purpose, a plaintext value of the encrypted data may be complemented with one or more random padding values before generating the encrypted data, i.e., before actually encrypting the data. In this way, it may be prevented that encryption of numbers, such as 0, 1, 2, . . . may be guessed by submitting calculations like "x–x" or "y/y" to the secure element 206.

The secure element 206 may further be configured to apply a timer that triggers a reset of the secure element 206, if a correct cryptographic key is not provided by the computing unit 200 to the secure element 206 before expiry of the timer. The timer may be employed as a watchdog timer that (e.g., after a predefined time period after the initialization or boot process of the computing unit 200 and/or on regular time periods thereafter) triggers a reset of the secure element 206 (and optionally of the computing unit 200 as well) to avoid analysis of the encrypted data and to prevent platform retargeting of the computing unit 200 to another purpose.

Figure 4:
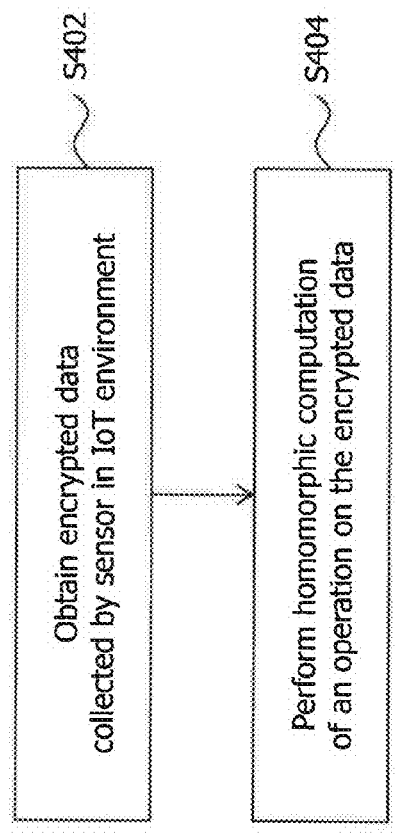
FIG. 4 schematically illustrates a flowchart of another method which may be performed by the computing unit of FIG. 2.

FIG. 4 schematically illustrates a flowchart of another method for securely performing an operation on encrypted data in the IoT environment 100. The method may be performed by the computing unit 200 which, in this case, does not comprise a secure element and which—with reference to the example of FIG. 1—may be the computing unit 200 which hosts analytics engine 102c. The method begins at step S402, at which the computing unit 200 obtains encrypted data collected by at least one of the sensors 104a and 104b. The encrypted data is encrypted using a homomorphic encryption scheme. At step S404, the computing unit 200 performs a homomorphic computation of an operation on the encrypted data to generate an encrypted result that, when decrypted, matches a result of the operation performed on plaintext of the encrypted data. The operation performed through the homomorphic computation may be a mathematical operation, such as a simple arithmetic operation (e.g., addition, multiplication, etc.), for example.

Thus, in the absence of a secure element in the computing unit 200, securely performing an operation on encrypted data is still possible through the use of homomorphic cryptography, though with a potentially higher workload.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

The invention claimed is:

1. A computing unit for securely performing an operation on encrypted data in an Internet of Things (IoT) environment, the computing unit comprising:
    a secure element;
    at least one processor; and
    at least one memory, the at least one memory containing instructions executable by the at least one processor such that the computing unit is operable to:
    obtain encrypted data collected by a sensor provided in the IoT environment;
    pass the encrypted data to the secure element requesting the secure element to decrypt the encrypted data and to perform an operation on the decrypted data;
    obtain a result of the operation from the secure element, wherein the operation is a comparison operation between two or more portions of the encrypted data, wherein the result of the operation is an unencrypted Boolean value, and wherein the decrypted data is not visible to the computing unit; and
    perform a conditional branch in a program flow based on the result of the operation.

2. The computing unit of claim 1, wherein the at least one memory further contains instructions executable by the at least one processor such that the computing unit is operable to:
    raise an alert based on the result of the operation.

3. The computing unit of claim 2, wherein the operation is an encrypted comparison operation.

4. The computing unit of claim 1, wherein the encrypted data is encrypted using a homomorphic encryption scheme.

5. The computing unit of claim 1, wherein the encrypted data is encrypted using a non-homomorphic encryption scheme.

6. The computing unit of claim 1, wherein a plaintext value of the encrypted data is complemented with one or more random padding values before generating the encrypted data, and/or
    wherein the secure element is configured to reject the operation, or to silently ignore the operation and mark the result as invalid, if the operation is predefined as an operation that allows guessing a plaintext value of the encrypted data.

7. The computing unit of claim 1, wherein a plaintext value of the encrypted data is supplemented with a checksum or hash value, and/or
    wherein a traceability field is appended to each plaintext value of the encrypted data, the traceability field initialized to at least one of a data sequence number and a unique device number, and then updated during calculations according to the same operations, or with a simple addition of the traceability field plus a code of the operation, performed on the data.

8. The computing unit of claim 1, wherein the secure element is configured to apply a timer that triggers a reset of the secure element, or the whole computing unit, if a correct cryptographic key is not provided by the computing unit to the secure element before expiry of the timer.

9. A method for securely performing an operation on encrypted data in an Internet of Things (IoT) environment, the method being performed by a computing unit which comprises a secure element and comprising:
    obtaining encrypted data collected by a sensor provided in the IoT environment;
    passing the encrypted data to the secure element requesting the secure element to decrypt the encrypted data and to perform an operation on the decrypted data;
    obtaining a result of the operation from the secure element, wherein the operation is a comparison operation between two or more portions of the encrypted data, wherein the result of the operation is an unencrypted Boolean value, and wherein the decrypted data is not visible to the computing unit; and
    performing a conditional branch in a program flow based on the result of the operation.

10. A non-transitory computer readable recording medium storing program code portions which when executed by a computing unit which comprises a secure element controls the computing unit to securely perform the steps of:
    obtaining encrypted data collected by a sensor provided in an Internet of Things (IoT) environment;
    passing the encrypted data to the secure element requesting the secure element to decrypt the encrypted data and to perform an operation on the decrypted data;
    obtaining a result of the operation from the secure element, wherein the operation is a comparison operation between two or more portions of the encrypted data, wherein the result of the operation is an unencrypted Boolean value, and wherein the decrypted data is not visible to the computing unit; and
    performing a conditional branch in a program flow based on the result of the operation.

11. The non-transitory computer readable medium of claim 10, wherein the program code portions stored on said non-transitory computer readable recording medium are part of a computer program product.

\* \* \* \* \*